US006618077B1

(12) United States Patent
Baïna et al.

(10) Patent No.: US 6,618,077 B1
(45) Date of Patent: Sep. 9, 2003

(54) METHOD FOR CONTROLLING A DIGITAL TELEVISION METROLOGY EQUIPMENT

(75) Inventors: Jamal Baïna, Nancy (FR); Hervé Bellamay, Metz (FR); Michel Richard, Cheminot (FR)

(73) Assignee: Telediffusion de France, Paris (FR)

( * ) Notice: Subject to any disclaimer, the term of this patent is extended or adjusted under 35 U.S.C. 154(b) by 0 days.

(21) Appl. No.: 09/554,946

(22) PCT Filed: Dec. 14, 1998

(86) PCT No.: PCT/FR98/02716

§ 371 (c)(1),
(2), (4) Date: May 22, 2000

(87) PCT Pub. No.: WO99/31890

PCT Pub. Date: Jun. 24, 1999

(30) Foreign Application Priority Data

Dec. 17, 1997 (FR) .............................. 97 16002

(51) Int. Cl.[7] .............................................. H04N 17/00
(52) U.S. Cl. ...................................... 348/192; 348/180
(58) Field of Search ............................... 348/192, 180; 714/746, 776, 798; 382/65, 66, 84, 85, 113

(56) References Cited

U.S. PATENT DOCUMENTS

| 5,473,385 A | | 12/1995 | Leske | |
| 5,559,999 A | * | 9/1996 | Maturi et al. ................ | 395/550 |
| 5,600,632 A | | 2/1997 | Schulman | |
| 5,654,751 A | * | 8/1997 | Richard, III ................ | 348/192 |
| 5,699,392 A | | 12/1997 | Dokie | |
| 5,742,623 A | * | 4/1998 | Nuber et al. ................ | 371/47.1 |
| 5,828,416 A | * | 10/1998 | Ryan ........................... | 348/512 |
| 6,026,506 A | * | 2/2000 | Anderson et al. ........... | 714/746 |

FOREIGN PATENT DOCUMENTS

| EP | 624983 | 11/1994 |
| EP | 786883 | 7/1997 |
| WO | WO 95/953338 | 12/1995 |

OTHER PUBLICATIONS

Schulman, M.A.: "End–To–End Performance Measurement for Interactive Multimedia Television", *Proceedings of the International Test Conference (ITC)*, Oct. 21–25, 1995, pp. 979–985, XP000552905, Washington.

* cited by examiner

*Primary Examiner*—Victor R. Kostak
(74) *Attorney, Agent, or Firm*—Alston & Bird LLP

(57) ABSTRACT

The invention relates to a method of controlling equipment for monitoring the quality of digital television signals comprising a data stream organized into frames. It comprises the following steps: a) selecting a reference time signal (PCR) in the data stream; b) on the basis of the reference time signal (PCR), generating a multibit digital clock signal (MTS) whose phase is servo-controlled from said reference time signal (PCR) and whose count is deduced unambiguously from the count of a time base (STC) generated during initial encoding of the digital television signals; and c) transmitting at least meaningful bits of the digital clock signal (MTS) to the measurement equipment synchronously with an analog video frame synchronizing signal (STV) as decoded from the data stream so as to generate a measurement triggering signal (MSTC).

12 Claims, 2 Drawing Sheets

METHOD FOR CONTROLLING A DIGITAL TELEVISION METROLOGY EQUIPMENT

FIELD OF THE INVENTION

The present invention relates to a method of controlling equipment for monitoring the quality of digital television signals.

Equipment for measuring quality, or more precisely for evaluating any possible degradation in quality, is already known and is designed to perform spot measurements, but does not make it easy to perform measurements at different points within a broadcast network, e.g. at the inlet to the network and at various nodes of the network, while also ensuring that the measurements are performed on the same image sequences.

SUMMARY OF THE INVENTION

An object of the present invention is to provide a method of controlling monitoring equipment that is capable of providing a solution to that problem.

The invention is based on the idea of generating a digital clock signal which is sampled on each video synchronization signal so as to make it possible to give the measurement equipment a reference for the beginning of the measurements to be performed, and also to time stamp information serving to mark the image sequence(s) to be subjected to measurement.

The invention thus provides a method of controlling equipment for monitoring the quality of digital television signals comprising a data stream organized into frames, the method being characterized in that it comprises the following steps:

a) selecting a reference time signal in the data stream;
b) on the basis of the reference time signal, generating a multibit digital clock signal whose phase is servo-controlled from said reference time signal and whose count is deduced unambiguously from the count of a time base generated during initial encoding of the digital television signals; and
c) transmitting at least meaningful bits of the digital clock signal to the measurement equipment synchronously with an analog video frame synchronizing signal as decoded from the data stream so as to generate a measurement triggering signal. The bits retained are at least those which are meaningful for the kind of measurements performed.

Step a) advantageously includes the following sub-steps:

$a_1$) selecting the frames which correspond to video data associated with a program; and
$a_2$) selecting said reference time signal from said frames.

For example, the digital television signals are in the MPEG-2 standard and during step $a_1$), frames are selected on the basis of the PID field.

Preferably, the specific video data is that on which audio and/or video quality measurements are performed. In which case, the method may include a step of decoding the video data from the frames selected on the basis of said PID field.

The selection of the reference time signal may be performed by testing a flag indicating the presence of said reference time signal in each frame under consideration.

For digital television signals in the MPEG-2 standard, the reference time signal can be the signal PCR or the signal SCR. Advantageously, during step b), said digital clock signal is at a frequency of k×27 MHz, where k is a non-zero integer or fraction.

The invention also provides equipment for measuring the quality of digital television signals comprising a data stream organized in frames, the equipment comprising:

an identifier device receiving the data stream as input and outputting a reference time signal selected from said data stream;
a clock generator whose phase is lock-ed on the basis of said reference time signal and outputting a multibit clock signal operating at a given frequency and whose count is deduced unambiguously from the count of a time base generated during the initial encoding of the digital video signals;
a sampler receiving on a first input at least meaningful bits of said multibit clock signal and on a second input an analog video frame synchronizing signal present at the output from a data stream decoder, and outputting on each occurrence of said analog video frame synchronizing signal a signal representing the updated value at least of the meaningful bits of the multibit clock signal; and
a measurement device receiving as input said updated value signal and generating as a consequence a signal for triggering measurements.

BRIEF DESCRIPTION OF THE DRAWINGS

Other characteristics and advantages of the invention will appear more clearly on reading the following description, given by way of non-limiting example and with reference to the accompanying drawings, in which.

DETAILED DESCRIPTION

Figure 1:
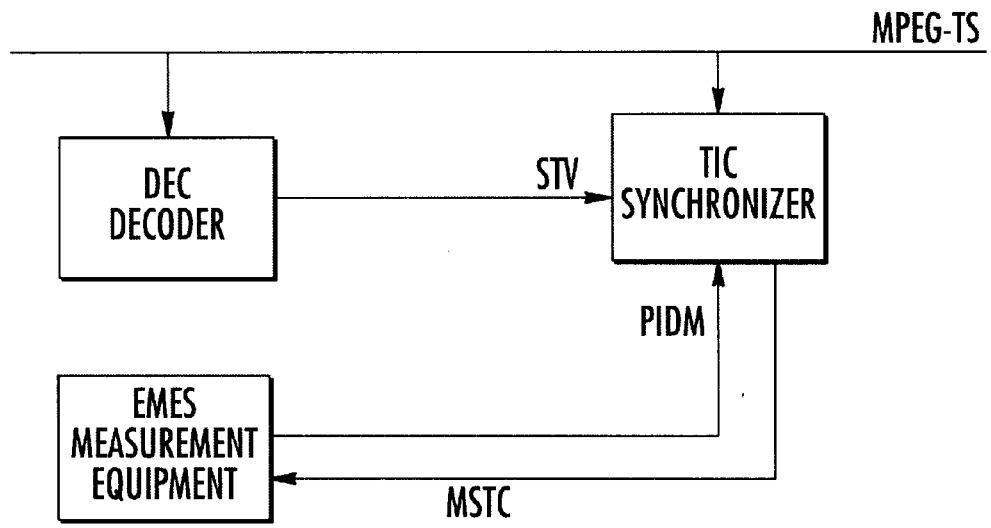
FIG. 1 is a block diagram of apparatus implementing the method of the invention.

The MPEG-2 standard [ISO/IEC 13818-1] specifies how one or more elementary video, audio, and data streams are to be combined into a stream that is suitable for transmission or storage. That standard provides information which is necessary and sufficient for synchronizing presentation at the output from a video and audio signal decoder, and for ensuring that the buffer memories or "buffers" of the decoder neither empty nor saturate. This information is constituted by time stamps concerning the decoding and presentation of video and audio signals, and time stamps concerning the supply of the binary stream itself.

The timing model described in that standard is a model that provides a constant delay. This is the delay between a signal entering the encoder and the same signal leaving the decoder. It is due to the encoding, to the buffers of the decoder, and to the presentation at the outlet from the decoder. Thus, each image and each audio sample is presented once and once only. In this way, the time interval between two images remains fixed. Furthermore, the frequency at which the audio signal is sampled is the same at the inlet to the encoder and at the outlet from the decoder.

The function of the time stamps is to ensure that the delay is constant and that the video and audio signals at the outlet from the decoder are synchronized. In fact, they are represented as a counter which increments on each clock pulse of a time base (known as the "system time clock" or STC at 27 MHz in the standard).

The constant delay and synchronization of video and audio signals at the outlet from the decoder can be obtained providing the encoders save the time stamps. This applies when the time stamps are transmitted to the decoder together with the associated signals, and the decoder makes use of them for controlling the timing with which signals are presented at its outlet.

The main time stamps are as follows:

SCR ("system clock reference") for the program stream and PCR ("program clock reference") for the transport stream.

These time stamps encode the time base used for the video and audio DTS and PTS (defined below) of a single program.

The STC time base is a 42-bit counter representing a clock operating at 27 MHz and the time stamps are encoded on 33+9 bits.

The SCR or the PCR are used in the decoder to regenerate the same STC time base as was used during encoding so as to ensure a constant delay.

DTS ("decoding time stamp"): this time stamp marks the instant at which an encoded signal block or "access unit" (AU) is presented at the inlet to the decoder. The time base is the preceding clock divided by 300 (thus giving a clock operating at 90 kHz), and this time stamp is encoded on 33 bits.

PTS ("presentation time stamp"): this time stamp marks the instant at which a decoded signal block or "presentation unit" is presented at the outlet of the decoder. The time base is the same clock as for the DTS (clock at 90 kHz), and this time stamp is encoded on 33 bits. The PTS must be present in each PES at least once every 0.7 seconds, and it is situated in the PES packet header.

It should be observed that the signals PTS and DTS represent time stamps relative to the STC time base. They do not correspond to absolute time (i.e. they specify neither the time of encoding nor the time of decoding).

The present invention proposes making use of the time data of the MPEG-2 system for controlling measurement equipment, and in particular equipment for measuring the quality of audio visual signals.

The invention consists in decoding the data stream, e.g. an MPEG-2-TS stream, so as to extract time stamp information therefrom (e.g. 3 bytes every 40 ms) for the purpose of controlling quality monitoring equipment, e.g. both audio and video, in digital TV.

When using the MPEG-2 standard, it is advantageous to use the PCR field (or indeed the SCR field) contained in the MPEG-2-TS stream and also the analog video signal so as to obtain a time indication as required for controlling equipment that measures the quality of audio and video signals.

The equipment given overall reference TIC is inserted in a digital TV network as shown in FIG. 1.

The equipment TIC receives the MPEG-TS multiprogram transport stream, possibly together with a signal PIDM representing the PID identifier of the frames to be selected, the signal PIDM being generated by the measurement equipment EMES. A decoder DEC receives the MPEG-TS stream and produces an analog frame synchronization signal STV which is applied to an input of the equipment TIC, which outputs a signal MSTC for triggering measurements, which signal is applied to an input of the measurement equipment EMES.

In particular, the measurement equipment EMES comprises an audio and video analyzer which processes the audio signals in baseband and which performs quality measurements on said signals. The method of the invention makes it possible to control the instant at which measurement begins, by using the signal MSTC, which constitutes a start-of-measurement "pulse" for the quality measurements that are to be carried out.

The equipment TIC performs the following functions: decoding the clock PCR; generating the system clock; and synchronization by means of the analog video signal STV for sampling said clock.

The MPEG-2-TS stream contains time information about the stamping of the digital data. The field PCR contained in the MPEG-2-TS frames makes it possible in particular to mark data in time. STC is generated on the basis of PCR. This is a data time stamp counter comprising a 42-bit counter representing a 27 MHz clock. The equipment TIC decodes the MPEG-2-TS stream and controls the measurement equipment by means of this time-stamp counter.

In an embodiment of the invention, the MPEG-2-TS stream is decoded so as to extract the PCR therefrom and synthesize a signal MTS whose count is deduced unambiguously, e.g. from the signal STC, and is, for example, equal to that of the signal STC. This data item makes it possible to create information referred to as MSTC (3 bytes over 40 ms). This operation serves to control equipment for monitoring audio and/or video quality, by triggering processing and by indexing the measured quality parameters on the basis of the signal MSTC.

An MPEG-2-TS frame contains various types of information. An MPEG-2-TS frame comprises 188 bytes in which there exist various special fields enabling an MPEG-2 decoder to recover the payload information.

In order to identify a given program, a packet identifier field (PID) is available on 13 bits.

The apparatus may include a module for identifying a specific PID, preferably that of the video data associated with the program on which video and audio quality measurements are being performed.

Figure 2:
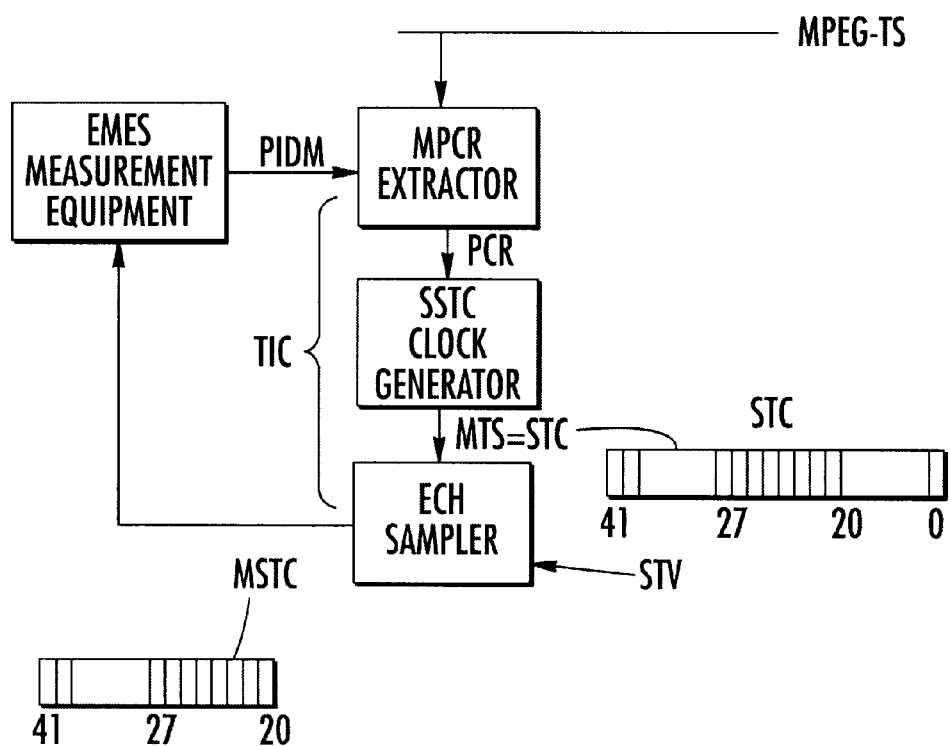
FIG. 2 is a block diagram showing how the TIC module of FIG. 1 operates.

As shown in FIG. 2, the equipment TIC has three

An extractor MPCR, (sometimes referred to herein as an identifier device), which serves to recover the 188-byte frames associated with the PIDM required by the measurement equipment EMES from the MPEG-TS stream, and to generate the PCR (or SCR) field on the basis of the frames recovered in this way.

A module SSTC which generates the signal STC on 42 bits on the basis on the signal PCR, as described below with reference to FIG. 4.

A sampler ECH which receives the signal STV provided by the decoder DEC and which samples at least the meaningful bits of the signal STC on each occurrence of the signal STV in order to generate the signal MSTC. It is preferable to retain only the useful meaningful bits of the signal STC, e.g. bits $b_{20}$ to $b_{41}$.

The field PCR occupies 42 bits in each frame (33 base bits, 6 reserved bits, 9 extension bits). The extractor MPCR for extracting the signal PCR initially tests the flag signalling the presence-of PCR in each frame under consideration and extracts therefrom the 42-bit information. This information represents refreshing the internal digital clocks of the encoders and decoders that are operated at the frequency of 27 MHz. The information PCR does not appear regularly in the data stream. The MPEG-2 standard requires the time between two frames containing PCR information to be no greater than 100 ms, but this does not present any significant drawback since this signal is used solely for setting the phase of the signal STC.

Figure 3:
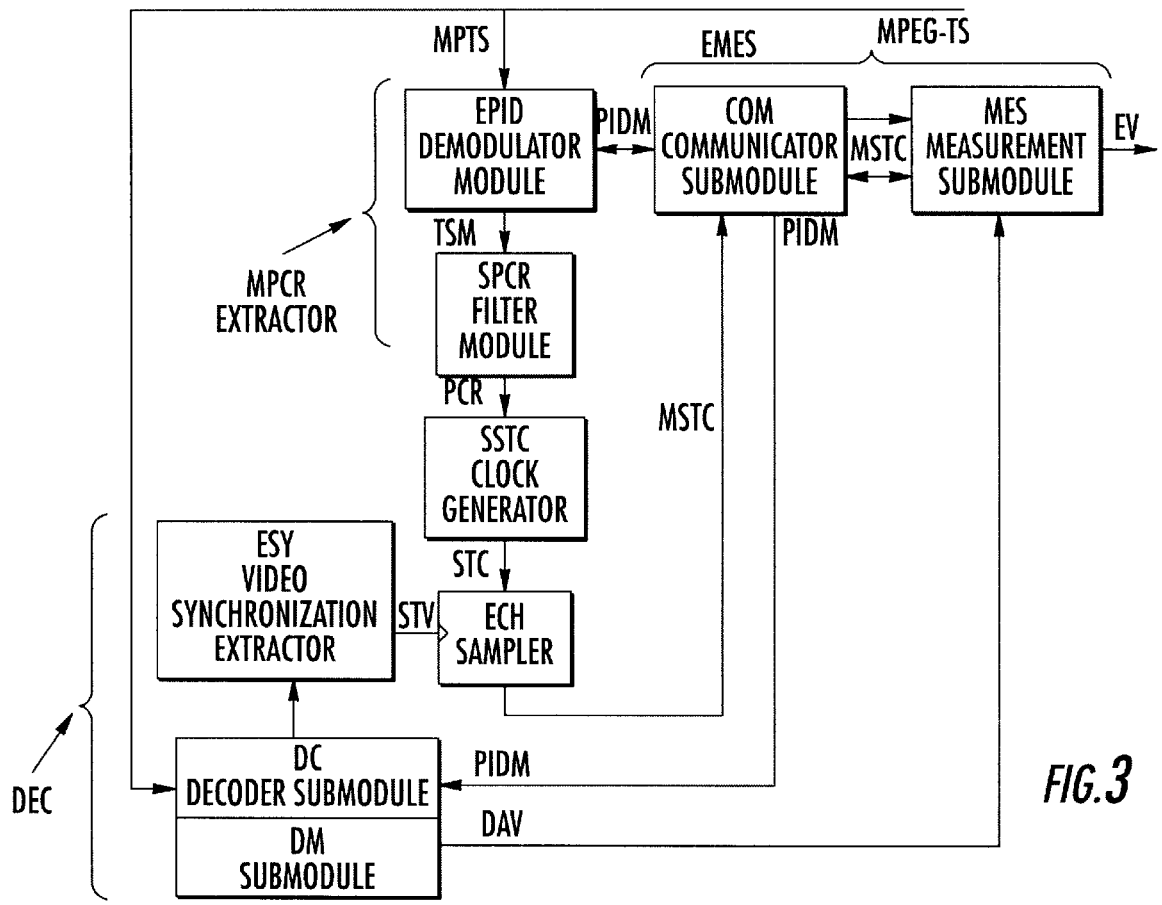
FIG. 3 shows an embodiment of the apparatus of FIG. 1.

As shown in FIG. 3, the module MPCR has a sub-module EPID which demodulates the MPEG-TS stream and outputs frames TSM that have been selected as a function of the PIDM. The sub-module SPCR applies a filter to these frames to detect the flags marking the presence of the signal PCR, which signal is reproduced at the outlet from the sub-module SPCR. The decoder DEC has a sub-module DC performing the decoding function proper, and a sub-module ESY which generates the analog signal STV. The decoder sub-module DC also receives the signal PIDM to select the frames on which measurement is to be performed in the preferred case where these frames are identical to those which are selected for playing back the signal STC. The measurement equipment includes a communications sub-module COM and a measurement sub-module MES. The sub-module COM supplies the signal PIDM to the sub-modules EPID and DC, it receives the signal MSTC, and it transmits it to the measurement sub-modules MES. Using the frames selected on the basis of the signal PIDM, the sub-module DM of the decoder supplies the audio-video data DAV in baseband to the measurement sub-module MES which outputs evaluation signals EV that identify the particular measurement equipment and that are labelled with the help of the signal MSTC.

To control the audio and video quality measuring equipment, a stable clock signal STC is generated at 27 MHz. To synthesize STC clocked by the 27 MHz clock compatible with the MPEG-2 standard, the module shown in FIG. 4 uses values of PCR and a servo-control loop (VCO) for controlling the phase of a clock at the frequency of 27 MHz to generate the signal STC. The principle on which STC synthesis relies is that of using a 27 MHz phase-locked loop for providing values of STC at the rate of 27 MHz on the basis of the values of PCR.

Figure 4:
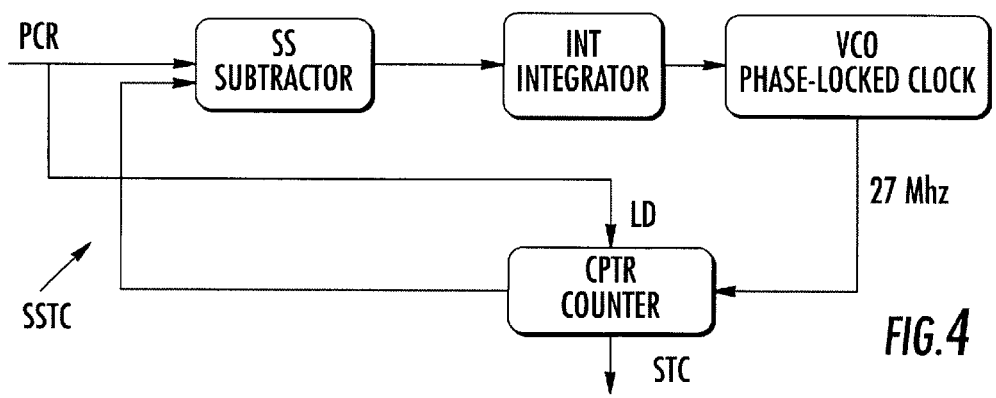
FIG. 4 shows the phase-locked loop of the SSTC module.

To this end, and as shown in FIG. 4, the signal PCR as output from the sub-module SPCR is applied to one of the inputs of a subtracter SS whose output is fed to an integrator INT whose output is in turn fed to the phase control input of a phase-locked 27 MHz clock. The output from this clock VCO increments a counter CPTR. The signal PCR is applied to the load input LD of the counter CPTR. Each time the signal PCR occurs, the value of the counter CPTR, after loading, is compared with the value of PCR in the subtracter SS, and the result of this comparison as present at the output from the subtracter SS, enables said phase locking to be provided.

The stream of STC values is too great compared with the measurement frequency of the audio and video quality analyzers. Use is made of time stamps that are referenced on the video frequency (image synchronization). Since two analog video images are separated by 40 ms, an example of the measurement frequency of the audio and video analyzers has been selected for the European standard, i.e. a rate of 40 ms or a multiple of 40 ms.

In the present case, the video synchronization extractor ESY delivers a "pulse" once every 40 ms. Using this pulse, the sampler extracts values of STC. The time between two audio and video quality measurements is 40 ms or a multiple of 40 ms. Synchronization relative to the analog video signal makes it possible to sample the counter. It also serves to provide the measurement equipments with a counter value once every 40 ms.

The rate at which the less significant bits vary is too high compared with 40 ms. The least significant bit $b_0$ changes once every 37 ns, the next bit $b_1$ changes once every 74 ns, and so on. Consequently, the less significant bits of this counter are not useful. It therefore suffices for the signal MTSC to retain the bits $b_{20}$ (which changes every 23 ms) to $b_{41}$ (which changes every 13h 15 min) to inform the measurement equipment when to begin performing measurements.

At the less significant bit end, it suffices to retain this down to the first bit which varies more quickly than the period at which measurements are taken. At the more significant bit end, it suffices to conserve a sufficiently large number of bits to be capable of discriminating between two series of measurements, given the time T required to propagate and to collect the measurement data. For example, if T=3 s, then it can be sufficient to retain bit $b_{28}$ as the most significant bit since that bit varies once every 5.8 seconds. Labelling can be performed, for example, by retaining bits $b_{25}$ to $b_{28}$.

Figure 5:
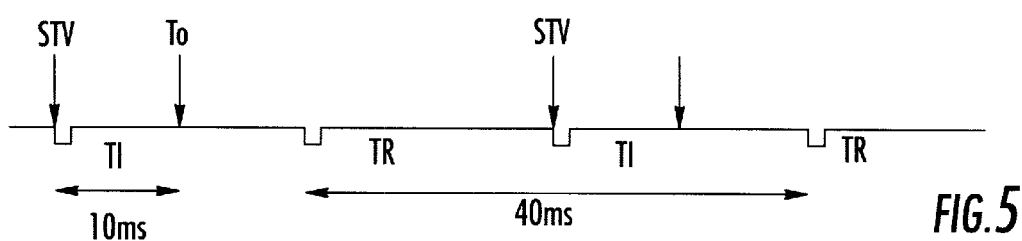
FIG. 5 is a timing diagram showing video synchronization.

FIG. 5 shows the signals STV present at the beginning of each odd frame TI. The duration of a pair of frames comprising an even frame TP and an odd frame TI is 40 ms. The figure also shows a signal TO that is offset by 10 ms from STV.

The signal MSTC is used for controlling equipment for measuring the quality of audio and/or video signals of other MPEG-2 signal monitoring apparatuses, by specifying the instant at which measurements start for triggering the measurement process and possibly also serving to label measurements with the value of MSTC so that it is subsequently possible to compare measurements performed on the same sequence, but at different points in a network.

What is claimed is:

1. A method of providing a triggering signal to equipment for monitoring the quality of digital television signals comprising a data stream organized into frames, the method comprising the following steps:
    a) selecting a reference time signal (PCR) in the data stream;
    b) on the basis of the reference time signal (PCR), generating a multibit digital clock signal (MTS) whose phase is servo-controlled from said reference time signal (PCR) and whose count is deduced unambiguously from the count of a time base (STC) generated during initial encoding of the digital television signals; and
    c) transmitting at least one bit of the digital clock signal (MTS) to the measurement equipment synchronously with an analog video frame synchronizing signal (STV) as decoded from the data stream so as to generate a measurement triggering signal (MSTC).

2. A method according to claim 1, wherein step a) comprises the following sub-steps:
    $a_1$) selecting the frames which correspond to video data associated with a program; and
    $a_2$) selecting said reference time signal from said frames.

3. A method according to claim 2, wherein the digital television signals are in the MPEG-2 standard and in that during step $a_1$), frames are selected on the basis of the PID field.

4. A method according to claim 2 wherein the video data is that on which audio and/or video quality measurements are performed.

5. A method according to claim 3, including a step of decoding the video data from the frames selected on the basis of said PID field.

6. A method according to claim 1, wherein the count of the multibit clock signal (MTS) is equal to the count of the time base (STC).

7. A method according to claim 1, wherein said selection of the reference time signal is performed by testing a flag indicating the presence of said reference time signal in each frame under consideration.

8. A method according to claim 1, wherein the digital television signals are in the MPEG-2 standard and the reference time signal is the signal PCR or the signal SCR.

9. A method according to claim 8, wherein said digital clock signal is at a frequency of k×27 MHz, where k is a non-zero integer or fraction.

10. Equipment for measuring the quality of digital television signals comprising a data stream organized in frames, the equipment comprising:

an identifier device (MPCR) receiving the data stream as input and outputting a reference time signal (PCR) selected from said data stream;

a clock generator (SSTC) whose phase is locked on the basis of said reference time signal (PCR) and outputting a multibit clock signal (MTS) operating at a given frequency and whose count is deduced unambiguously from the count of a time base (STC) generated during the initial encoding of the digital video signals;

a sampler (ECH) receiving on a first input at least one bit of said multibit clock signal (MTS) and on a second input an analog video frame synchronizing signal (STV) present at the output from a data stream decoder (DEC), and outputting on each occurrence of said analog video frame synchronizing signal (STV) a signal representing the updated value at least the at least one bit of the multibit clock signal (NTS);

a measurement device (EMES) receiving as input said updated value signal and generating as a consequence a signal (MSTC) for triggering measurements.

11. Equipment according to claim 10, wherein the identifier device has a selection input receiving a frame identifier signal corresponding to video data associated with a program, and in that it is organized to select said reference time signal from said frames.

12. Equipment according to claim 10, wherein the count of the multibit digital clock signal (MTS) is equal to the count of said time base (STC).

* * * * *